United States Patent [19]

Durenec

[11] Patent Number: 4,472,632
[45] Date of Patent: Sep. 18, 1984

[54] BORESIGHT COLLIMATOR

[75] Inventor: Peter Durenec, Annandale, Va.

[73] Assignee: The United States of America as represented by the Secretary of the Army, Washington, D.C.

[21] Appl. No.: 388,812

[22] Filed: Jun. 16, 1982

[51] Int. Cl.³ .............................................. H01J 31/50
[52] U.S. Cl. ..................................... 250/333; 250/347
[58] Field of Search ..................... 250/333, 467.1, 347, 250/505.1; 378/148; 33/234

[56] References Cited

U.S. PATENT DOCUMENTS

| | | | |
|---|---|---|---|
| 2,479,580 | 8/1949 | Marco | 285/331 |
| 2,689,141 | 9/1954 | Kiekhaefer | 285/409 |
| 3,517,447 | 6/1970 | Fox | 434/1 |
| 4,168,429 | 9/1979 | Lough | 250/330 |
| 4,266,873 | 5/1981 | Hacskaylo et al. | 356/251 |
| 4,417,814 | 11/1983 | Doliber | 356/252 |

*Primary Examiner*—Janice A. Howell
*Assistant Examiner*—Constantine Hannaher
*Attorney, Agent, or Firm*—Anthony T. Lane; Milton W. Lee; Aubrey J. Dunn

[57] ABSTRACT

A boresight collimator usable with three different night-vision (infrared) sights for the U.S. Army TOW missile. These sights must be boresighted to the visible light (day) sight already on the missile launcher, but each night sight is differently mounted. The collimator has a readily adjustable bracket for attaching to the night sights and for allowing both the visible and infrared collimating images to be seen in their respective sights.

5 Claims, 3 Drawing Figures

BORESIGHT COLLIMATOR

The invention described herein may be manufactured, used, and licensed by the U.S. Government for governmental purposes without the payment of any royalties thereon.

BACKGROUND OF THE INVENTION

This invention is in the field of collimators for tube-launched weapon sights. A specific example of such a weapon is the U.S. Army TOW missile system. This system includes a launch tube from which a missile is fired and a sight affixed to and bore-sighted to the tube. The original sight of the system was intended for daylight use, but night sights using infrared detectors are now frequently used. Naturally, it is necessary to boresight the night sights with the launch tube. This may be easily accomplished by bore-sighting the night sight with respect to the day sight rather than directly to the launch tube. Unfortunately, there are currently three types of night sights: AN/TAS-4, AN/TAS-6, and GLLD, and each of these sights has a different mount from the others on the launch tube. It would thus seem that three different collimators would be required for these night sights, but a single collimator has been made capable of boresighting the three sights. This collimator, however, is not field-adjustable for its three sight modes, but must be set up in a maintenance depot having equipment to evacuate and purge the collimator after adjustment. Of course, the collimator is out of service for a field user during its trips to and from depot and while at depot. The instant invention provides a collimator which is readily adjustable in the field by its operator, and which requires no special training or equipment for such adjustment.

SUMMARY OF THE INVENTION

The invention is a boresight collimator having a bracket for mounting the collimator on an infrared weapon sight. The bracket has an opening therethrough whereby an infrared window on the collimator may be seen by the weapon sight. Moreover, the bracket is adjustable with respect to the housing such that the correct one of two visible-light windows aligns with a visible-light (day) sight on the weapon. The various boresighting marks and a collimating mirror in the collimator are adjustable with respect to the longitudinal axis of the collimator such that an erect image is seen in the various sights during boresighting.

DESCRIPTION OF PREFERRED EMBODIMENT

Figure 1:
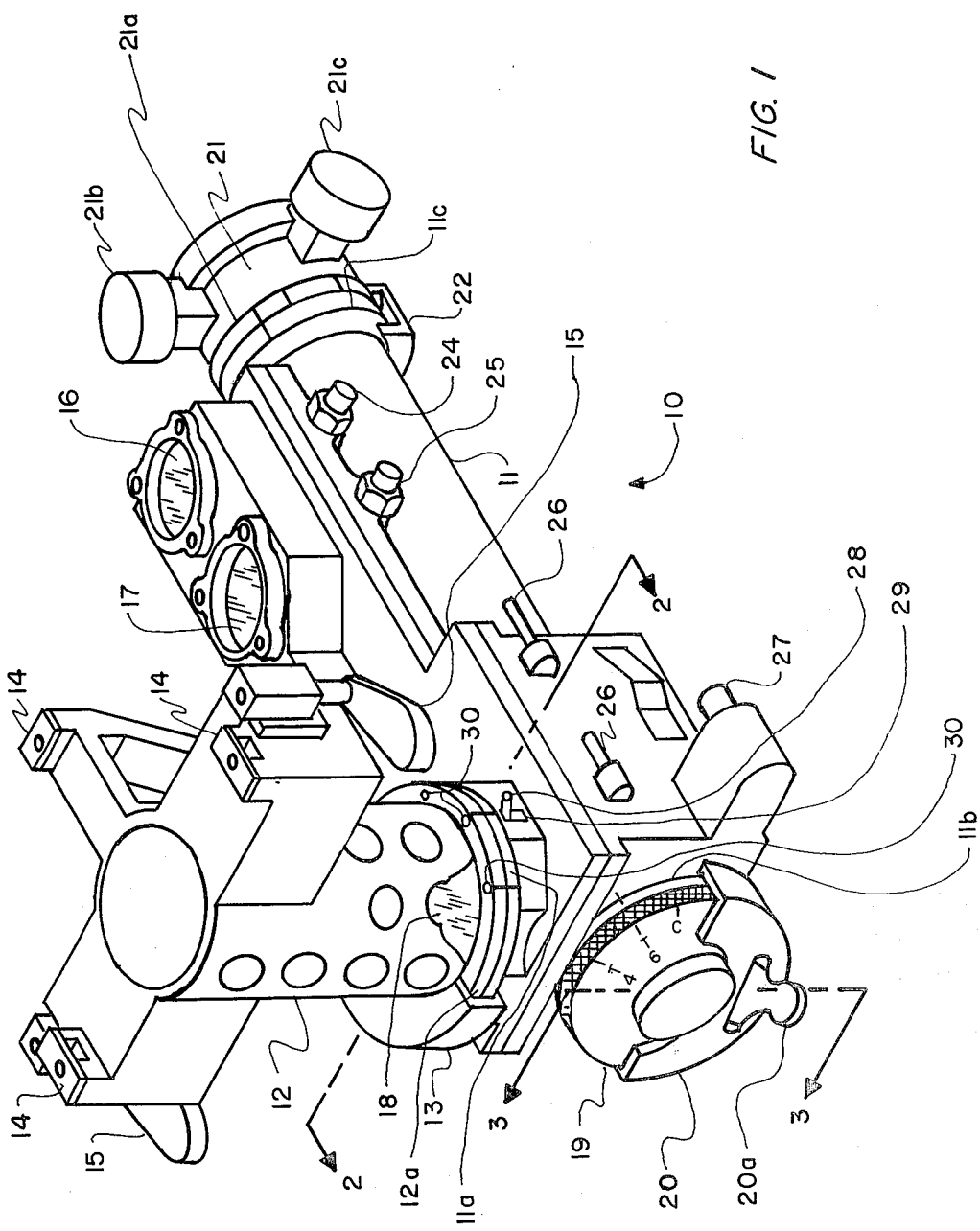
FIG. 1 shows a pictoral view of the invention.
Figure 2:
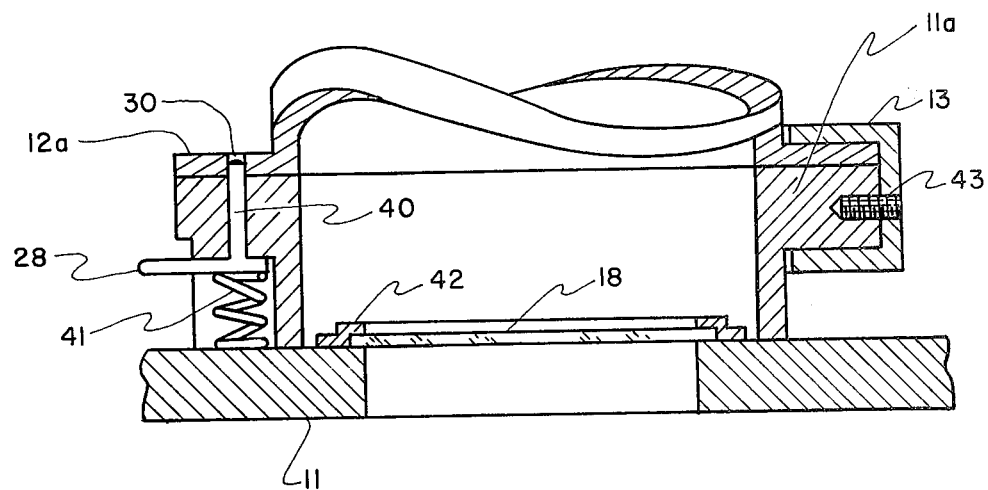
FIG. 2 shows a partial sectional detail taken in direction 2—2 in FIG. 1.

The invention may be best understood when this description is taken in conjunction with the drawings, in which FIG. 1 shows the inventive collimator generally designated 10. The major parts of 10 include housing 11 and mounting bracket 12 held onto 11 by collar 13. This collar fits over portions of respective flanges 11a and 12a on housing 11 and bracket 12. Collimator 10 is mounted onto equipment (TOW sight, for example) to be boresighted by placing mounting pads 14 of bracket 12 onto the front housing of the said equipment and by engaging latches 15 in holes in the equipment. Housing 11 contains means for producing both visible and infrared test images and windows 16, 17, and 18 allow these images to be seen by the sights of the equipment. Windows 16 and 17 are both for visible images and window 18 is for an infrared image such as a reticle or resolution bars. Several longitudinal optical paths are defined in housing 11 for the images. These paths originate in reticle assembly 19. This assembly is held onto flange 11b of housing 11 by collar 20 and knurled for easy finger adjustment when latch 20a of collar 20 is released. The reticle assembly carries both a visible light source (point source) and a heated reticle for infrared. The infrared image and the visible image both pass through a hole in an angled mirror (inside 11) to a collimating mirror (also inside 11), are reflected back to the angled mirror and out through windows 16, 17, and 18. The infrared image passes through infrared-transparent window 18, and the visible image is split to emerge from both windows 16 and 17. The collimating mirror is carried by collimating mirror assembly 21 on housing 11. This assembly has flange 21a held against flange 11c of housing 11 by collar 22. This collar is similar to collars 13 and 20, and is shown in detail in my co-pending U.S. patent application Ser. No. 362,417 of Mar. 26, 1982, entitled Adjusting Plate Retainer. Assembly 21 includes adjustment knobs 21b and 21c for respective elevation and azimuth adjustments of the collimating mirror; the assembly itself can be rotatably adjusted around the longitudinal axis of housing 11 (as can assembly 19). Assembly 19 and flanges 11b, 11c, and 21a are marked in order that assemblies 19 and 21 may be properly adjusted for the particular equipment being adjusted. Numerals 24, 25, 26, and 27 respectively designate a filler valve (through which housing 11 may be evacuated and purged with dry nitrogen), a safety relief valve (for excess nitrogen pressure), battery guide pins, and a battery connector. The collimator batteries (not shown) power the image sources. Mounting bracket 12 is rotatably adjustable by loosening collar 13 and depressing lever 28 in slot 29. This lever withdraws a pin (pin 40 of FIG. 2) from one of holes 30 and allows angular movement of bracket 12 with respect to housing 11. Flange 12a is marked for the various positions of 12. More detail of bracket 12 can be seen in FIG. 2. Pin 40 is attached to lever 28 and is biased toward hole 30 by spring 41. Infrared mirror 18 is retained by retainer ring 42, and collar 13 is fixed to flange 11a by setscrew 43. This figure is taken to a different scale from FIG. 1.

Figure 3:
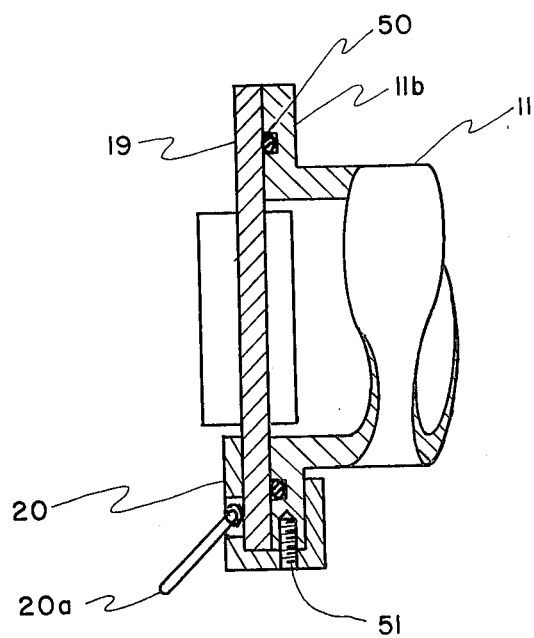
FIG. 3 shows a partial sectional detail taken in direction 3—3 in FIG. 1.

FIG. 3 shows some of the details of the assembly 19 mounting. Between 19 and flange 11b is O-ring 50 in shallow slots in 19 and 11b. This ring retains gas pressure when lever 20a is moved to release 19 for adjustment. Assembly 21 is mounted to housing 11 in a similar manner to assembly 19.

The use of the invention is very straightforward. After one determines the particular night sight being used, he releases each of collars 13, 20, and 22 and respectively adjusts bracket 12 (after depressing lever 28), assembly 19, and assembly 21. He then tightens collars 13, 20, and 22, places bracket 12 on the night sight and secures it to the sight, with latches 15. Although the various sights are differently mounted to the TOW launch tube, they are all adapted to accept bracket 12. The proper one of windows 16 and 17 then will be aligned with the missile day sight. One turns on the power (i.e., plugs in the batteries) for the infrared and visible images, looks through the day sight, and adjusts knobs 21b and 21c to center the visible image in the day sight. It is assumed that the day sight is already bore sighted to the missile launcher axis by its own collimator. One then boresights the night sight by looking through it (with its power on) at the infrared image provided by collimator 10 and by adjusting the night sight centering controls. Finally, the collimator is deenergized and removed from the night sight.

I claim:

1. A boresight collimator including a gas-tight housing filled with dry nitrogen and having a longitudinal axis, a mounting bracket attached to said housing and adapted for attaching to a night sight, an infrared window on said housing aligned with an opening through said mounting bracket, two visible-light windows on said housing, a collimating mirror assembly on said housing; a reticle assembly on said housing, the improvements comprising:

means for rotatably adjusting said mounting bracket with respect to said housing;

means for adjusting said reticle assembly around said axis; and means for adjusting said collimating mirror assembly around said axis.

2. The collimator as set forth in claim 1 wherein said means for rotatably adjusting includes mating flange means on said housing and said bracket releasable collar means on at least a portion of said flange means for keeping said flange means mated, and indexing means between said flange means.

3. The collimator as recited in claim 2 wherein said indexing means includes a pin carried by one of said flange means for engaging holes in the other flange means.

4. The collimator as set forth in any of claims 1, 2, or 3 wherein said means for adjusting said reticle assembly includes a flange on said housing, wherein said reticle assembly has a portion outside said housing, mating with said flange, and releasable collar means for holding said portion against said flange.

5. The collimator as recited in any one of claims 1, 2, or 3 wherein said means for adjusting said collimating mirror assembly includes flange means, and said housing includes mating flange means to said flange means, and releasable collar means for keeping said flange means mated.

* * * * *